United States Patent [19]
Garvin, III

[11] Patent Number: 6,099,035
[45] Date of Patent: Aug. 8, 2000

[54] WHEELED OR VEHICLE-MOUNTED CART APPARATUS

[76] Inventor: John F. Garvin, III, 121 New Bridge Rd., Rising Sun, Md. 21911

[21] Appl. No.: 09/140,229

[22] Filed: Aug. 26, 1998

Related U.S. Application Data

[60] Provisional application No. 60/058,908, Sep. 3, 1997.

[51] Int. Cl.[7] .............................. B62B 1/00; B62B 3/00; B60R 7/00; B60R 11/00
[52] U.S. Cl. .................. 280/769; 280/47.24; 280/47.34; 224/486; 224/521; 224/497
[58] Field of Search ................................ 280/47.24, 769, 280/47.18, 47.19, 47.26, 79.7, 47.34; 224/486, 511, 519, 521, 524, 488, 495, 497

[56] References Cited

U.S. PATENT DOCUMENTS

| | | | |
|---|---|---|---|
| 4,234,284 | 11/1980 | Hauff | 224/521 X |
| 4,375,113 | 3/1983 | Ewert | 280/47.24 X |
| 4,593,840 | 6/1986 | Chown | 280/769 X |
| 4,744,590 | 5/1988 | Chesney | 280/769 |
| 4,813,584 | 3/1989 | Wiley | 224/521 X |
| 4,971,509 | 11/1990 | Sechovec et al. | 224/486 |
| 5,018,651 | 5/1991 | Hull et al. | 280/769 X |
| 5,328,192 | 7/1994 | Thompson | 280/47.24 |
| 5,368,209 | 11/1994 | Hill | 280/769 X |
| 5,692,779 | 12/1997 | Hedgepeth | 280/769 |
| 5,769,449 | 6/1998 | Keesee | 224/511 X |
| 5,826,768 | 10/1998 | Gamulo | 224/486 |
| 5,881,937 | 3/1999 | Sadler | 224/521 X |

Primary Examiner—J. J. Swann
Assistant Examiner—F. Zeender

[57] ABSTRACT

A cart apparatus includes a base assembly which includes a floor and walls which project upward from the floor. A first multipurpose connection bracket is attached to a bottom side of the floor. A pair of handle/leg reception brackets are attached to one end of the base assembly. The handle/leg reception brackets are oriented at an acute orientation angle with respect to a top surface of the walls. A second multipurpose connection bracket is attached to the bottom side of the floor. The first multipurpose connection bracket is attached adjacent to a first side of the floor, and the second multipurpose connection bracket is attached adjacent to a second side of the floor. Each of the first and second multipurpose connection brackets is located medially along the floor. The floor includes drain holes. Support beams are connected between the base assembly and the multipurpose connection bracket. The cart apparatus can be used either attached to a motor vehicle or free-standing on its own wheels.

8 Claims, 3 Drawing Sheets

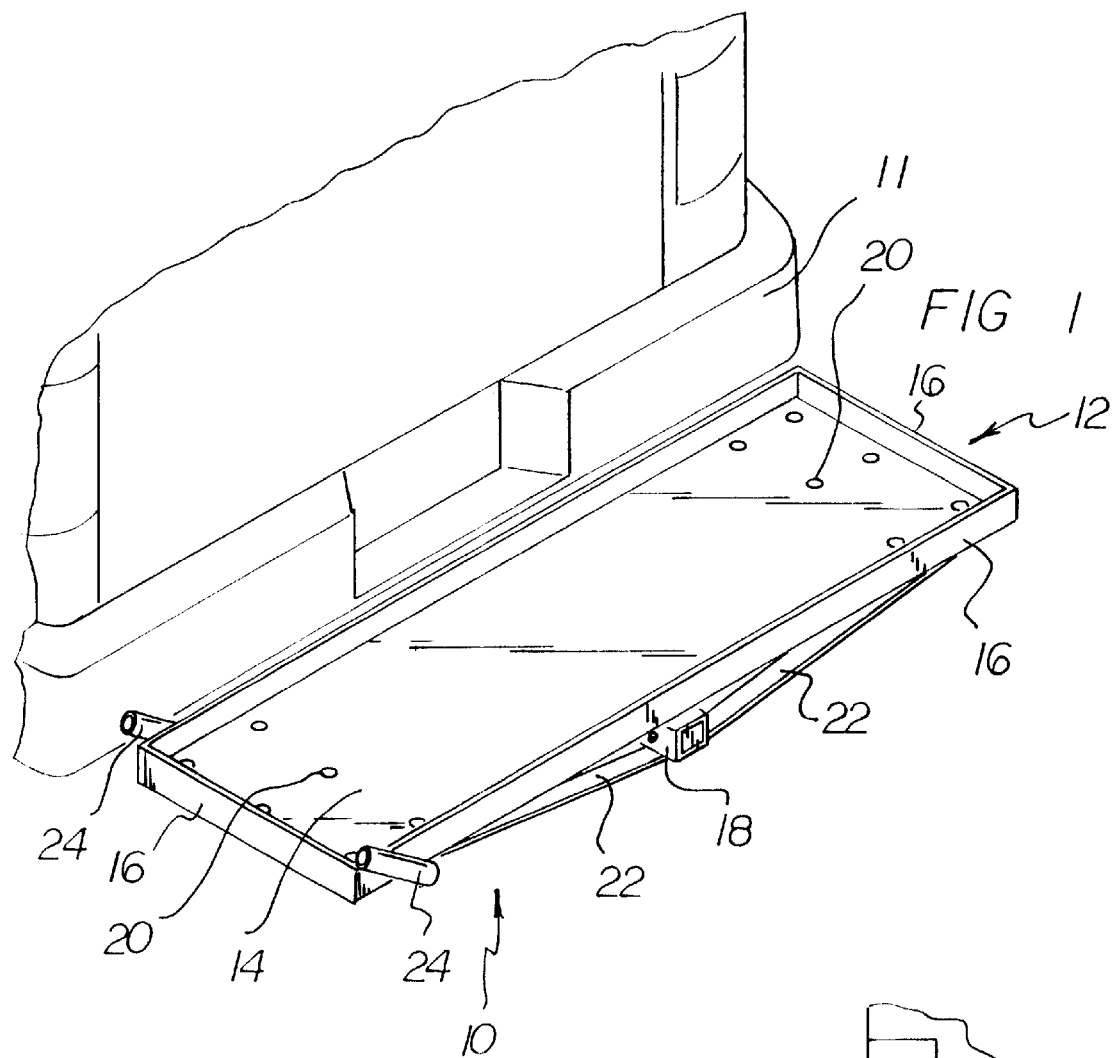
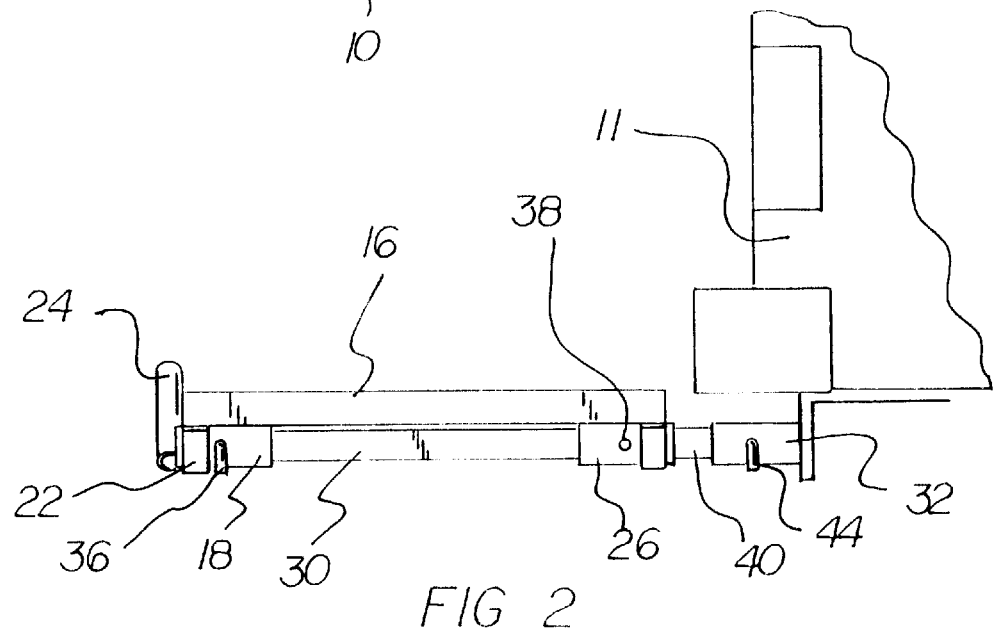

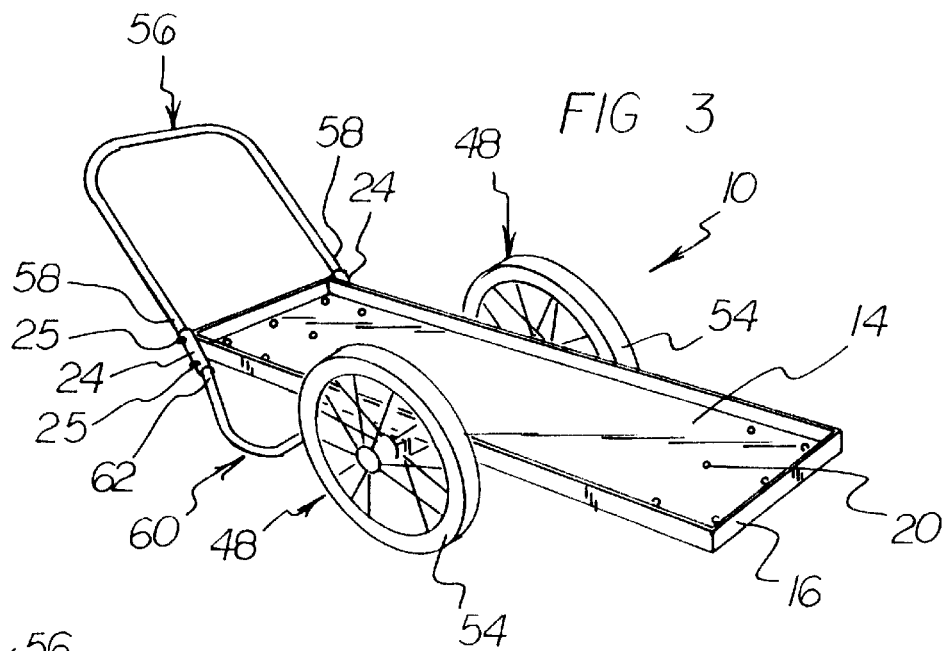
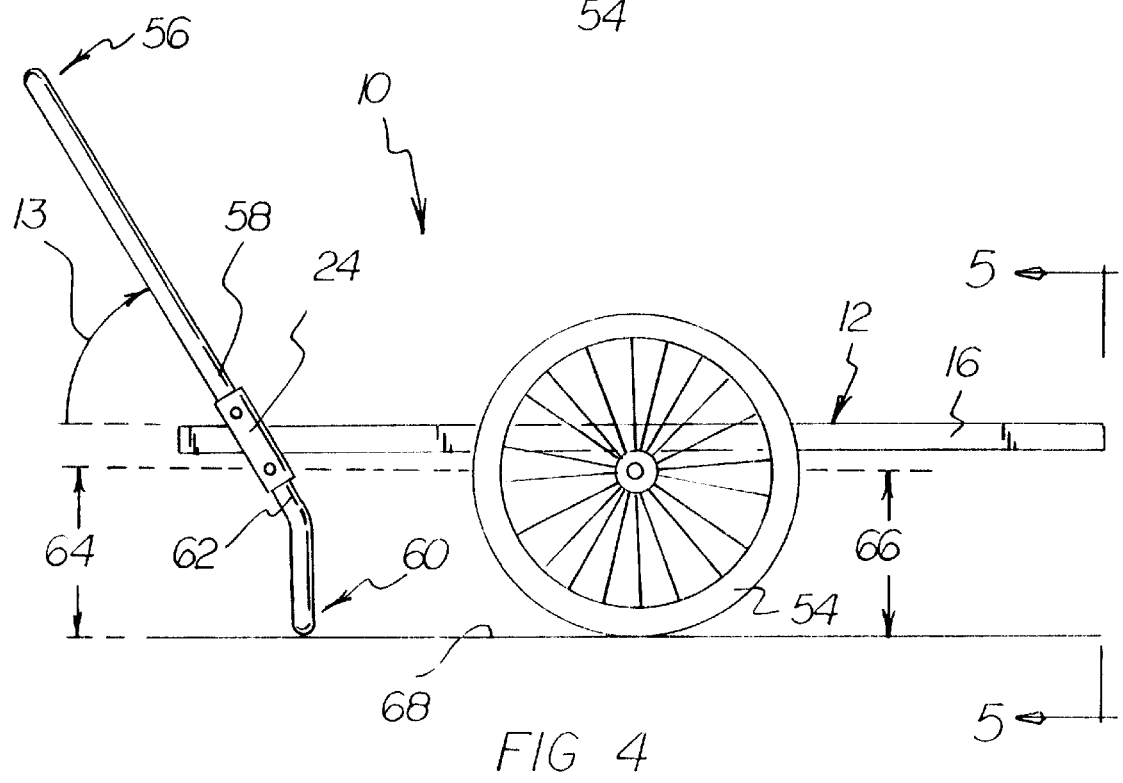

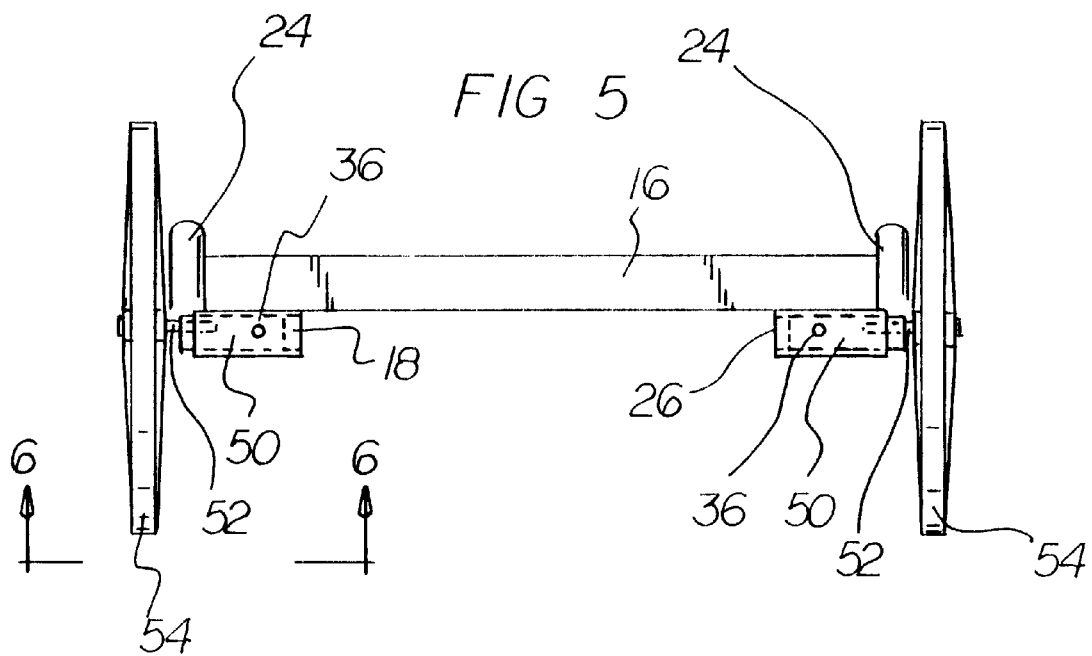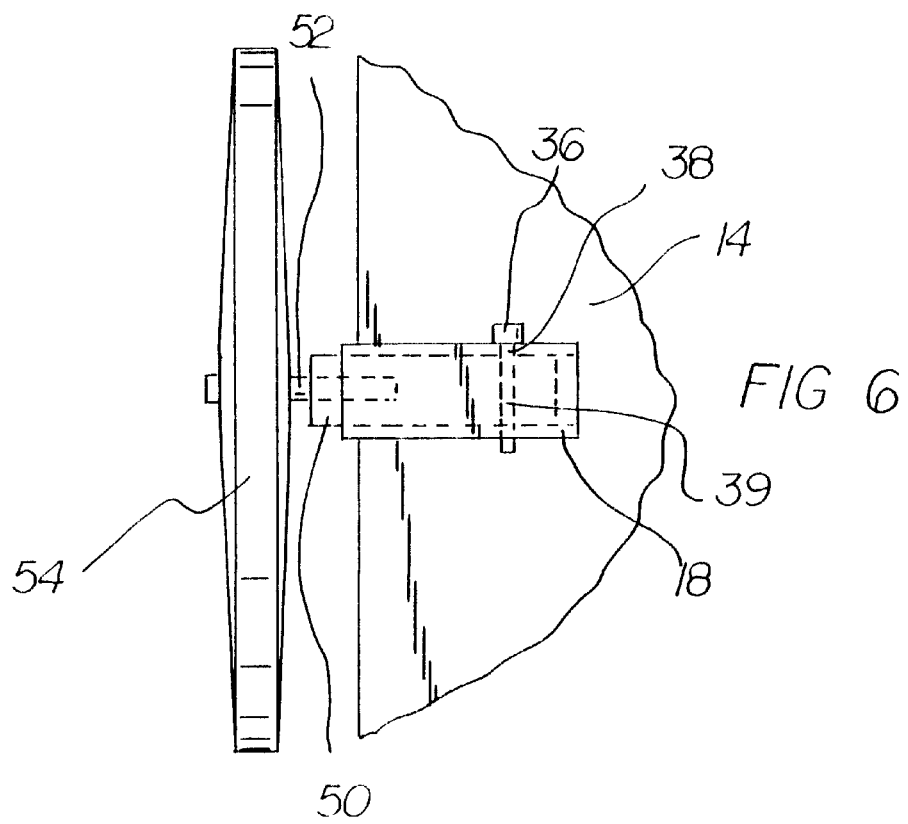

WHEELED OR VEHICLE-MOUNTED CART APPARATUS

CROSS-REFERENCE TO RELATED APPLICATIONS

This application claims priority based upon my prior copending Provisional application Ser. No. 60/058,908, filed Sep. 3, 1997.

BACKGROUND OF THE INVENTION

1. Field of the Invention

The present invention relates generally to article carriers attached to vehicles and, more particularly, to auxiliary article carriers attached to trailer hitches.

2. Description of the Prior Art

The use of auxiliary article carriers attached to trailer hitches is well known in the art as exemplified by the following U.S. Pat. Nos. which are representative of some of those auxiliary carriers: 4,744,590 and 5,368,209. More specifically, U.S. Pat. No. 4,744,590 discloses an auxiliary carrier that attaches to a trailer hitch when carried by a vehicle and that is removable from the vehicle to be moved on wheel assemblies carried by the auxiliary carrier. The wheel assemblies are connected to and supported by the auxiliary carrier even when the auxiliary carrier is attached to the trailer hitch. Moreover, when the auxiliary carrier is removed from the trailer hitch and when the wheel assemblies are in use, there is no provision for maintaining the auxiliary carrier and an article supported thereon in a horizontal orientation when a person lets go of the auxiliary carrier. To avoid the complexities of having wheel assemblies attached to a vehicle-attached auxiliary carrier even when the auxiliary carrier is carrier by a trailer hitch, it would be desirable if a vehicle-attached article carrier were provided that does not include wheel assemblies that are carried by the auxiliary carrier when the auxiliary carrier is supported by the trailer hitch. Also, to permit an auxiliary carrier and an article contained thereon to be oriented horizontally when the auxiliary carrier is removed from the trailer hitch and when the auxiliary carrier is supported by wheel assemblies, it would be desirable if an auxiliary carrier included a support leg.

U.S. Pat. No. 5,368,209 discloses another vehicle-attached article carrier that includes wheel assemblies that are carried by the carrier, even when the carrier is attached to a trailer hitch. Moreover, this carrier also does not include means for retaining the carrier in a horizontal orientation when the carrier is not attached to the trailer hitch.

As a matter of interest, U.S. Pat. No. 5,328,192 discloses a manually operated wheeled article carrier. No provision is made for attaching this article carrier to a trailer hitch of a vehicle.

Still other features would be desirable in a wheeled or vehicle-mounted cart apparatus. For example, for purposes of simplicity of design, it would be desirable if a vehicle-attached article carrier included one set of attachment brackets either for attaching the carrier to a vehicle or, alternatively, for attaching wheel assemblies to the carrier. In addition, it would be desirable if a vehicle-attached article carrier had a single set of brackets for attaching both a handle and a support leg to the carrier.

Thus, while the foregoing body of prior art indicates it to be well known to use vehicle-attached article carriers, the prior art described above does not teach or suggest a vehicle-attached article carrier apparatus which has the following combination of desirable features: (1) does not include wheel assemblies that are carried by the apparatus when the apparatus is supported by the trailer hitch; (2) has a support leg for orienting the apparatus horizontally when the apparatus is removed from the trailer hitch and is supported by wheel assemblies; (3) includes one set of attachment brackets either for attaching the apparatus to a vehicle or, alternatively, for attaching wheel assemblies to the apparatus; and (4) has a single set of brackets for attaching both a handle and a support leg to the apparatus. The foregoing desired characteristics are provided by the unique wheeled or vehicle-mounted cart apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a cart apparatus which includes a base assembly which includes a floor and walls which project upward from the floor. A first multipurpose connection bracket is attached to a bottom side of the floor. A pair of handle/leg reception brackets are attached to one end of the base assembly. The handle/leg reception brackets are oriented at an acute orientation angle with respect to a top surface of the walls. A second multipurpose connection bracket is attached to the bottom side of the floor. The first multipurpose connection bracket is attached adjacent to a first side of the floor, and the second multipurpose connection bracket is attached adjacent to a second side of the floor. Each of the first and second multipurpose connection brackets is located medially along the floor. The floor includes drain holes. Support beams are connected between the base assembly and the multipurpose connection bracket. The cart apparatus can be used either attached to a motor vehicle or free-standing on its own wheels.

To support the cart apparatus on a vehicle, a vehicle-connectable support beam is threaded through the first multipurpose connection bracket and the second multipurpose connection bracket, wherein a portion of the vehicle-connectable support beam projects outward from the base assembly. Lock pins are inserted through pin-reception channels in the multipurpose connection brackets and through pin-reception channels in the vehicle-connectable support beam which are in registration with the pin-reception channels in the multipurpose connection brackets.

To have the cart apparatus free standing on its own wheels, a pair of wheel assemblies are provided, wherein each wheel assembly includes a wheel connector member which is received in a respective multipurpose connection bracket. Each wheel assembly also includes an axle connected to the wheel connector member and also includes a wheel received on the axle.

A handle includes handle ends which are received in top portions of the handle/leg reception brackets. A support leg includes leg ends which are received in bottom portions of the handle/leg reception brackets.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved wheeled or vehicle-mounted cart apparatus which has all of the advantages of the prior art and none of the disadvantages.

It is another object of the present invention to provide a new and improved wheeled or vehicle-mounted cart apparatus which may be easily and efficiently manufactured and marketed.

It is a further object of the present invention to provide a new and improved wheeled or vehicle-mounted cart apparatus which is of durable and reliable construction.

An even further object of the present invention is to provide a new and improved wheeled or vehicle-mounted cart apparatus which is susceptible of a low cost of manufacture with regard to both materials and labor, and which accordingly is then susceptible of low prices of sale to the consuming public, thereby making such wheeled or vehicle-mounted cart apparatus available to the buying public.

Still yet a further object of the present invention is to provide a new and improved wheeled or vehicle-mounted cart apparatus which does not include wheel assemblies that are carried by the apparatus when the apparatus is supported by the trailer hitch.

Still another object of the present invention is to provide a new and improved wheeled or vehicle-mounted cart apparatus that has a support leg for orienting the apparatus horizontally when the apparatus is removed from the trailer hitch and is supported by wheel assemblies.

Yet another object of the present invention is to provide a new and improved wheeled or vehicle-mounted cart apparatus which includes one set of attachment brackets either for attaching the apparatus to a vehicle or, alternatively, for attaching wheel assemblies to the apparatus.

Even another object of the present invention is to provide a new and improved wheeled or vehicle-mounted cart apparatus that has a single set of brackets for attaching both a handle and a support leg to the apparatus.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a preferred embodiment of the wheeled or vehicle-mounted cart apparatus of the invention mounted at the rear of a pickup truck.

FIG. 2 is a side view of the embodiment of the wheeled or vehicle-mounted cart apparatus shown in FIG. 1.

FIG. 3 is a perspective view showing a preferred embodiment of the wheeled or vehicle-mounted cart apparatus of the invention having wheels, a handle, and a support leg.

FIG. 4 is an enlarged side view of the embodiment of the invention shown in FIG. 3.

FIG. 5 is a rear view of the embodiment of the invention shown in FIG. 4 taken along line 5—5 with the handle and support leg removed.

FIG. 6 is a partial bottom view of the embodiment of the invention shown in FIG. 5 taken along line 6—6 thereof.

DESCRIPTION OF THE PREFERRED EMBODIMENT

With reference to the drawings, a new and improved wheeled or vehicle-mounted cart apparatus embodying the principles and concepts of the present invention will be described.

Turning to the figures, FIGS. 1–2 show an exemplary embodiment of the wheeled or vehicle-mounted cart apparatus of the invention mounted on a pickup truck and generally designated by reference numeral 10. FIGS. 3–6 shown this embodiment of the invention with wheels, a handle, and support feet.

More specifically with respect to FIGS. 1–2, the wheeled or vehicle-mounted cart apparatus 10 includes a base assembly 12 which includes a floor 14 and walls 16 which project upward from the floor 14. A first multipurpose connection bracket 18 is attached to a bottom side of the floor 14. A pair of handle/leg reception brackets 24 are attached to one end of the base assembly 12. The handle/leg reception brackets 24 are oriented at an acute orientation angle 13 with respect to a top surface of a walls 16. A second multipurpose connection bracket 26 is attached to the bottom side of the floor 14. The first multipurpose connection bracket 18 is attached adjacent to a first side of the floor 14, and the second multipurpose connection bracket 26 is attached adjacent to a second side of the floor 14. Each of the first and second multipurpose connection brackets is located medially along the floor 14. The floor 14 includes drain holes 20 which permit liquids, such as water, to drain off from the base assembly 12. Support beams 22 are connected between the base assembly 12 and the multipurpose connection bracket 18.

To use the cart apparatus 10 on a pickup truck 11, such as shown in FIGS. 1 and 2, vehicle-connectable support beam 30 is threaded through the first multipurpose connection bracket 18 and the second multipurpose connection bracket 26, wherein a portion of the vehicle-connectable support beam 30 projects outward from the base assembly 12. The outwardly projecting portion 40 of the vehicle-connectable support beam 30 is inserted into a complimentary beam-reception bracket 32 on the pickup truck 11. Lock pins 36 are inserted through pin-reception channels 38 in the multipurpose connection brackets and through pin-reception channels in the vehicle-connectable support beam 30 which are in registration with the pin-reception channels 38 in the multipurpose connection brackets. The outwardly projecting portion 40 of the vehicle-connectable support beam 30 includes a pin-reception channel which is placed in registration with a pin-reception channel in the beam-reception bracket 32 of the pickup truck 11. Another lock pin 44 enters the respective pin-reception channels for locking the vehicle-connectable support beam 30 to the beam-reception bracket 32.

Turning to FIGS. 3–6, the cart apparatus 10 of the invention is shown detached from the pickup truck 11 and self supporting. More specifically, pair of wheel assemblies 48 are provided, wherein each wheel assembly 48 includes a wheel connector member 50 which is received in a respective multipurpose connection bracket. Each wheel assembly 48 also includes an axle 52 connected to the wheel connector member 50 and also includes a wheel 54 received on the axle 52. A lock pin 36 is used to secure a respective wheel connector member 50 to a respective multipurpose connection bracket. Each multipurpose connection bracket has pin-reception channels 38, and each wheel connector member 50 has a pin-reception channel 39 for receiving a respective lock pin 36.

A handle 56 includes handle ends 58 which are received in top portions of the handle/leg reception brackets 24. A support leg 60 includes leg ends 62 which are received in bottom portions of the handle/leg reception brackets 24. The support leg 60 and the handle/leg reception brackets 24 are dimensioned so that when the support leg 60 is installed in the handle/leg reception brackets 24, the effective vertical height 64 of the support leg 60 is approximately equal to the radial size 66 the wheel 54. In this way, the base assembly 12 is oriented substantially horizontally when the wheels 54 and the bottom of the support leg 60 are on a horizontal surface 68. The handle 56 and the support leg 60 are fixed to the handle/leg reception brackets 24 using lock pins 25.

To convert the cart apparatus 10 from use on the pickup truck 11 to use with the wheel assemblies 48, the handle 56, and the support leg 60, the lock pin 44 and the lock pins 36 are removed from the arrangement shown in FIG. 2. The vehicle-connectable support beam 30 is removed from the beam-reception bracket 32 and the multipurpose connection brackets. In this way, the cart apparatus 10 is free from the pickup truck 11.

Then, the respective wheel assemblies 48 are installed in the respective multipurpose connection brackets, and the lock pins 36 are reinstalled to keep the respective wheel connector members 50 fixed in the respective multipurpose connection brackets.

The leg ends 62 are inserted into the bottom portions of the handle/leg reception brackets 24, and the handle ends 58 are inserted into the top portions of the handle/leg reception brackets 24. Then, the lock pins 25 are installed to fix the handle 56 and the support leg 60 to the handle/leg reception brackets 24. Then, a load (not shown) can be placed on the base assembly 12, the handle 56 can be grasped, lifted, and pushed, and the load can be moved with the wheels 54 rolling on the ground. When moving is complete, the handle 56 can be released, and the support leg 60, along with the wheels 54, will support the load.

To reuse the cart apparatus 10 on the pickup truck 11 or simply to store the cart apparatus 10 in a disassembled form, the wheel assemblies 48 are removed from the multipurpose connection brackets, and the handle 56 and the support leg 60 are removed from the handle/leg reception brackets 24. In a storage mode, the vehicle-connectable support beam 30 and the various lock pins can also be stored in a disassembled mode.

The components of the wheeled or vehicle-mounted cart apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved wheeled or vehicle-mounted cart apparatus that is low in cost, relatively simple in design and operation, and which does not include wheel assemblies that are carried by the apparatus when the apparatus is supported by the trailer hitch. With the invention, a wheeled or vehicle-mounted cart apparatus is provided which has a support leg for orienting the apparatus horizontally when the apparatus is removed from the trailer hitch and is supported by wheel assemblies. With the invention, a wheeled or vehicle-mounted cart apparatus is provided which includes one set of attachment brackets either for attaching the apparatus to a vehicle or, alternatively, for attaching wheel assemblies to the apparatus. With the invention, a wheeled or vehicle-mounted cart apparatus is provided which has a single set of brackets for attaching both a handle and a support leg to the apparatus.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A cart apparatus connectable to a vehicle comprising in combination:

a base assembly which includes a floor and walls which project upward from said floor, a first multipurpose connection bracket attached to a bottom side of said floor, a pair of handle/leg reception brackets attached to one end of said base assembly, a second multipurpose connection bracket attached to said bottom side of said floor, wherein said first multipurpose connection bracket is attached adjacent to a first side of said floor, and wherein said second multipurpose connection bracket is attached adjacent to a second side of said floor, a vehicle-connectable support beam adapted to be threaded and un-threaded through said first multipurpose connection bracket and said second multipurpose connection bracket, wherein a portion of said vehicle-connectable support beam projects outwardly from said base assembly for connection and disconnection to a vehicle, a pair of wheel assemblies, wherein each wheel assembly includes a wheel connector member, wherein each wheel connector member is adapted to be received in a respective multipurpose connection bracket when said vehicle-connectable support beam is un-threaded from said first and second multipurpose connection brackets and said base assembly is dis-connected from said vehicle, and wherein each wheel assembly also includes an axle connected to said wheel connector member and a wheel received on said axle.

2. The apparatus of claim 1 wherein said handle/leg reception brackets are oriented at an acute orientation angle with respect to a top surface of the walls.

3. The apparatus of claim 1 wherein said floor includes drain holes.

4. The apparatus of claim 1 wherein each of said first and second multipurpose connection brackets is located medially along said floor.

5. The apparatus of claim 1, further including:

support beams connected between said base assembly and said first and second multipurpose connection brackets.

6. The apparatus of claim 1, further including:

lock pins inserted through pin-reception channels in said multipurpose connection brackets and through pin-reception channels in said vehicle-connectable support beam which are in registration with said pin-reception channels in said multipurpose connection brackets.

7. The apparatus of claim 1, further including:

a handle which includes handle ends received in top portions of said handle/leg reception brackets.

8. The apparatus of claim 1, further including:

a support leg which includes leg ends received in bottom portions of said handle/leg reception brackets.

* * * * *